United States Patent [19]

Hayashi et al.

[11] Patent Number: 4,670,173

[45] Date of Patent: Jun. 2, 1987

[54] OIL-SOLUBLE REACTION PRODUCTS OF AN ACYLATED REACTION PRODUCT, A POLYAMINE, AND MONO-FUNCTIONAL ACID

[75] Inventors: Katsumi Hayashi, Mentor, Ohio; T. Robert Hopkins, Sebring, Fla.; Curtis R. Scharf, Wickliffe, Ohio

[73] Assignee: The Lubrizol Corporation, Wickliffe, Ohio

[21] Appl. No.: 811,084

[22] Filed: Dec. 19, 1985

[51] Int. Cl.$^4$ .......................................... C10M 145/10
[52] U.S. Cl. ................................ 252/51.5 A; 525/285; 525/301; 525/309
[58] Field of Search .................. 252/51.5 A; 525/285, 525/301, 309

[56] References Cited

U.S. PATENT DOCUMENTS

| | | | |
|---|---|---|---|
| 2,524,424 | 10/1950 | Buret | 260/79.5 |
| 2,845,403 | 7/1958 | Gunberg | 260/78.4 |
| 2,993,057 | 7/1961 | Gleason | 260/346.6 |
| 3,240,762 | 3/1966 | Wilks e al. | 260/78.4 |
| 3,365,411 | 1/1968 | Mertzweiller et al. | 260/29.7 |
| 3,527,736 | 9/1970 | Averink et al. | 260/78.4 |
| 3,567,691 | 3/1971 | Van Breen et al. | 260/78.4 |
| 3,766,215 | 10/1973 | Hesse et al. | 260/346.8 |
| 3,887,527 | 6/1975 | Okamura et al. | 260/78.4 |
| 3,935,140 | 1/1976 | So et al. | 260/19 UA |
| 3,952,023 | 4/1976 | Kaiya et al. | 260/346.8 |
| 3,953,541 | 4/1986 | Fuji | 260/878 R |
| 3,998,912 | 12/1976 | Zeutler et al. | 260/878 R |
| 4,010,223 | 3/1977 | Caywood | 260/875 |
| 4,033,888 | 7/1977 | Kiovsky | 252/56 D |
| 4,073,737 | 2/1978 | Elliott | 252/51.5 A |
| 4,077,893 | 3/1978 | Kiovsky | 252/56 R |
| 4,080,493 | 3/1978 | Yasvi et al. | 526/192 |
| 4,082,817 | 4/1978 | Imaizumi et al. | 260/879 |
| 4,089,794 | 5/1978 | Engel et al. | 252/51.5 A |
| 4,117,036 | 9/1978 | Honda et al. | 260/878 R |
| 4,137,185 | 1/1979 | Gardiner et al. | 252/33 |
| 4,141,847 | 2/1979 | Kiovsky | 252/51.5 A |
| 4,145,298 | 3/1979 | Trepka | 252/51.5 A |
| 4,160,739 | 7/1979 | Stambaugh et al. | 252/34 |
| 4,161,452 | 7/1979 | Stambaugh et al. | 252/34 |
| 4,161,571 | 7/1979 | Yasui et al. | 526/90 |
| 4,284,414 | 8/1981 | Bryant | 44/62 |
| 4,292,414 | 9/1981 | Saito et al. | 525/255 |
| 4,320,019 | 3/1982 | Hayashi | 252/51.5 A |
| 4,357,250 | 11/1982 | Hayashi | 252/51.5 A |
| 4,410,656 | 10/1983 | Caan et al. | 542/529 |
| 4,412,087 | 10/1983 | Trepka | 252/51.5 A |
| 4,486,573 | 12/1984 | Hayashi | 525/285 |
| 4,505,834 | 3/1985 | Papay et al. | 252/51.5 A |
| 4,508,874 | 4/1985 | Hergenrother | 525/285 |
| 4,578,429 | 3/1986 | Gereen | 525/285 |
| 4,594,378 | 6/1986 | Lipton et al. | 252/51.5 A |
| 4,596,663 | 6/1986 | Hayashi | 252/51.5 A |

FOREIGN PATENT DOCUMENTS 1548464  10/1977  United Kingdom .
2097800   5/1982  United Kingdom .

*Primary Examiner*—Jacqueline V. Howard
*Attorney, Agent, or Firm*—Forrest L. Collins; Denis A. Polyn; James L. Cordek

[57] ABSTRACT

Oil-soluble compositions, useful as dispersant viscosity modifiers, are formed by the reaction product of an acylating product (D) a (F) polyamine, and a (G) monofunctional acid. The compositions can be prepared in solvent such as a hydrocarbon oil or in the absence of a solvent.

45 Claims, No Drawings

OIL-SOLUBLE REACTION PRODUCTS OF AN ACYLATED REACTION PRODUCT, A POLYAMINE, AND MONO-FUNCTIONAL ACID

TECHNICAL FIELD

The present invention relates to reacting polyamines and mono-functional acids with an acylating block copolymer.

BACKGROUND

Heretofore various solution reactions have been carried out between a polymer containing unsaturation and an anhydride.

For example, U.S. Pat. No. 2,524,424 to Buret relates to the treatment of rubberlike polymers from butadiene hydrocarbons with carboxylic acid anhydrides.

U.S. Pat. No. 2,845,403 to Gunberg relates to making rubbery adducts by chemical reaction of maleic anhydride with butyl rubber.

U.S. Pat. No. 2,993,057 to Gleason relates to copolymers prepared from multiolefins and vinyl aromatic compounds which have a hydrocarbon group attached to the alpha position of the vinyl group.

U.S. Pat. No. 3,240,762 to Wilks et al relates to a maleic anhydride hydrogenated polycyclopentadiene reaction product.

U.S. Pat. No. 3,365,411 to Mertzweiller et al relates to a blend of (1) a polymeric half ester of a hydroxylated polymer and a saturated or unsaturated polycarboxylic acid or anhydride or its amination product with (2) a polymeric adduct of a polymer or copolymer of a conjugated diolefin and an unsaturated polycarboxylic acid anhydride or its amination product.

U.S. Pat. No. 3,527,736 to Averink et al relates to the improvement of green strength of synthetic diene polymers (lithium-polyisoprene) by the reaction with an olefinic unsaturated 1,2-dicarboxylic acid (maleic anhydride) in a solvent.

U.S. Pat. No. 3,567,691 to Van Breen et al relates to a process for the preparation of reaction products of a synthetic diene rubber with maleic anhydride.

U.S. Pat. No. 3,766,215 to Hesse et al relates to a process for the preparation of adducts from maleic anhydride and liquid, low-molecular weight polybutadienes.

U.S. Pat. No. 3,887,527 to Okamura et al relates to modifying cis-1,4-polyisoprene rubber with maleic anhydride with substantially no increase in gel.

U.S. Pat. No. 3,935,140 relates to an aqueous coating composition having a water soluble or dispersible material prepared by the addition reaction of at least one alpha-beta unsaturated dicarboxylic compound with a mixture of a natural drying oil and a specific liquid copolymer containing 1,3-pentadiene and 1,3-butadiene units therein.

U.S. Pat. No. 3,952,023 to Kaiya relates to preparing an adduct of (A) a butadiene lower polymer or butadiene lower copolymer and (B) an alpha-beta-ethylenically unsaturated dicarboxylic acid compound by a method characterized in that said (A) and (B) are caused to react in the presence of one or more compounds selected from (C) p-phenylenediamine derivatives.

U.S. Pat. No. 3,953,541 to Fuji relates to a process for the preparation of polyolefin graft copolymers.

U.S. Pat. No. 3,998,912 to Zeitler et al relates to grafting carboxylic acid onto copolymers of ethylene and carboxylates.

U.S. Pat. No. 4,033,888 to Kiovsky relates to lubricating oil additives allegedly having both dispersant and viscosity-index improving properties which are prepared by reacting a block copolymer with maleic anhydride and an alkene polyol.

British Pat. No. 1,548,464 to Shell relates to reacting a hydrogenated block copolymer with maleic anhydride and the subsequent reaction thereof with an amine containing compound.

U.S. Pat. No. 4,073,737 to Elliott relates to hydrogenated copolymers of conjugated dienes and when desired, a vinyl aromatic monomer which are useful as oil additives.

U.S. Pat. No. 4,410,656 to Coran et al relates to a method masticating diene rubber in the presence of maleic acid or maleic anhydride together with sulfur or an organic sulfur compound capable of generating a thiyl radical.

U.S. Pat. No. 4,010,223 to Caywood relates to an adduct containing succinic groups attached to an elastomeric copolymer of an EPDM type copolymer. The reaction is carried out free of any free radical initiators.

U.S. Pat. No. 4,080,493 to Yasui et al relates to a process for the production of the maleic anhydride adduct of a liquid polymer.

U.S. Pat. No. 4,082,817 to Imaizumi et al relates to a process for producing a maleic anhydride adduct of high molecular weight 1,2-polybutadiene.

U.S. Pat. No. 4,089,794 to Engle et al relates to polymeric dispersant additives for lubricating oils comprising ethylene and one or more $C_3$ to $C_{28}$ alpha-olefins which have been solution-grated in the presence of a free radical initiator with an ethylenically unsaturated carboxylic acid material in elevated temperatures and thereafter reacted with a polyfunctional material reactive with carboxylic groups such as a polyamine, or a polyol.

U.S. Pat. No. 4,117,036 to Honda et al relates to functional high polymeric substances having alpha, beta, unsaturated carboxylate and the compositions therefrom.

U.S. Pat. No. 4,160,739 and 4,161,452 to Stambaugh et al relates to polyolefins copolymer additives for lubricants and fuels wherein the backbone can be sytrene-butadiene copolymers and the grafted units are the residues of a monomer system comprising maleic acid or anhydride with one or more other monomers copolymerizable therewith. Further reaction with amine compounds are disclosed.

U.S. Pat. No. 4,161,571 to Yasui et al relates to a process for the production of the maleic anhydride adduct of a liquid polymer.

U.S. Pat. No. 4,284,414 to Byrant relates to mixed alkyl esters of interpolymers for use in crude oils.

U.S. Pat. No. 4,292,414 to Saito et al relates to a process for preparing modified block copolymers by graft reacting at least one maleic acid compound with an aromatic vinyl compound/conjugated diene compound block copolymer.

U.S. Pat. No. 4,505,834 to Papay relates to lubricating oil compositions containing graft copolymers as a viscosity index improver-dispersant.

U.S. Pat. No. 4,077,893 and 4,141,847 to Kiovsky relate to lubricating oil additives allegedly having both dispersant and viscosity index improving properties which are prepared by hydrogenating star-shaped polymers of at least four arms of polymers or copolymers of dienes and monoalkenyl arenes with an alpha-beta unsaturated carboxylic acid and then reacting the resulting intermediate with either a polyol or an amine.

U.S. Pat. No. 4,145,298 to Trepka relates to nitrogen-containing copolymers which are prepared by the reaction of lithiated hydrogenated conjugated diene-vinylarene copolymers with nitrogen-containing organic compounds.

U.S. Pat. No. 4,320,019 to Hayashi relates to reaction products prepared by reacting EPDM type copolymers with olefinic carboxylic acid acylating agents to form an acylating reaction intermediate which is further reacted with an amine.

U.S. Pat. No. 4,486,573 to Hayashi relates to hydrocarbyl substituted carboxylic acid reagents containing from about 2 to about 20 carbon atoms, exclusive of the carboxyl-based groups with one or more high molecular weight olefin polymers having 1 to 20 carbon atoms.

U.S. Pat. No. 4,137,185 to Gardner et al relates to a stabilized imide graft of ethylene copolymeric additives for lubricants.

British Pat. No. 2,097,800 relates to oil-soluble viscosity index improving ethylene copolymers, such as copolymers of ethylene and propylene, which are reacted or grafted with ethylenically unsaturated carboxylic acid moieties and further reacted with polyamines having two or more primary amine groups and a carboxylic acid component.

SUMMARY OF THE INVENTION

Accordingly, it is an aspect of the present invention to provide an oil-soluble composition which contains polyamines reacted with an acylating hydrogenated block copolymer in the presence of a mono-functional acid.

It is a further aspect of the present invention to provide an oil-soluble composition, as above, which is useful as a dispersant as well as a viscosity improver and can be made in the presence of a solvent or in a solvent-free environment.

These and other aspects of the present invention will become apparent from the following specification which describes in detail the preparation of the composition.

In general, an oil soluble product comprising; the reaction product of: an (D) acylating reaction product and a (F) polyamine, and a (G) mono-functional acid.

DESCRIPTION OF PREFERRED EMBODIMENTS

According to the present invention, a composition of matter suitable for use as a viscosity improver/dispersant is made by reacting a (A) hydrogenated block copolymer and (B) an alpha-beta olefinically unsaturated reagent in the presence of (C) free radical intiators. The reaction product of (A), (B) and (C) is referred to as acylating reaction product (D) which can be further reacted with (E) a primary amine containing compound, that is, ammonia or a compound which contains only one primary amino group therein. Reaction product (D) can be carried out in a solvent such as mineral oil or in a solvent-free environment. A further embodiment relates to reacting the acylating reaction product (D) with a (F) polyamine and a (G) mono-functional acid in either a solvent or solvent-free environment.

Considering the (A) hydrogenated block copolymer, it comprises either a normal block copolymer, that is a true block copolymer or a random block copolymer. Considering the true or normal block copolymer, it is generally made from conjugated dienes having from 4 to 10 carbon atoms and preferably from 4 to 6 carbon atoms as well as from vinyl substituted aromatics having from 8 to 12 carbon atoms and preferably 8 or 9 carbon atoms.

Examples of vinyl substituted aromatics include styrene, alpha-methylstyrene, ortho-methylstyrene, meta-methylstyrene, para-methylstyrene, para-tertiary-butylstyrene, with styrene being preferred. Examples of such conjugated dienes include piperylene, 2,3-dimethyl-1,3-butadiene, chloroprene, isoprene and 1,3-butadiene, with isoprene and 1,3-butadiene being particularly preferred. Mixtures of such conjugated dienes are useful.

The normal block copolymers have a total of from 2 to about 5, and preferably 2 or 3, polymer blocks of the vinyl substituted aromatic and the conjugated diene with at least one polymer block of said vinyl substituted aromatic and at least one polymer block of said conjugated diene being present. The conjugated diene block is hydrogenated as more fully set forth hereinbelow. The normal block copolymers can be linear block copolymers wherein a substantially long sequence of one monomeric unit (Block I) is linked with another substantially long sequence of a second (Block II), third (Block III), fourth (Block IV), or fifth (Block V) monomeric unit. For example, if a is a styrene monomeric unit and d is a conjugated diene monomeric unit, a tri-block copolymer of these monomeric units can be represented by the formula:

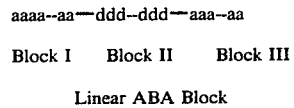

Linear ABA Block

These copolymers can also be radial block copolymers wherein the polymer blocks are linked radially as represented by the formula:

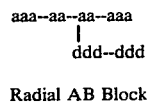

Radial AB Block

In practice, the number of repeat units involved in each polymer block usually exceeds about 500, but it can be less than about 500. The sequence length in one block should be long enough so that the block copolymer exhibits the inherent homopolymeric physical properties such as glass transition temperature and polymer melt temperature.

The vinyl substituted aromatic content of these copolymers, that is the total amount of vinyl substituted aromatic blocks in the normal block copolymer, is in the range of from about 20 percent to about 70 percent by weight and preferably from about 40 percent to about 60 percent by weight. Thus, the aliphatic conjugated diene content, that is the total diene block content, of these copolymers is in the range of from about 30 percent to about 80 percent by weight and preferably from bout 40 percent to about 60 percent by weight.

These normal block copolymers can be prepared by conventional methods well known in the art. Such copolymers usually are prepared by anionic polymerization using, for example, an alkali metal hydrocarbon (e.g., sec-butyllithium) as a polymerization catalyst.

Examples of suitable normal block copolymers as set forth above include Shellvis-40, and Shellvis-50, both hydrogenated styrene-isoprene block copolymers, manufactured by Shell Chemicals.

Considering the random block copolymer which can be utilized separately, in combination with the normal block copolymers set forth above, or not at all, it is generally defined as a block copolymer having one or more block polymer portions therein. More specifically, the random block copolymers can be defined as an indeterminate number of a and d blocks of indeterminate lengths. These random copolymers are generally made from conjugated dienes of the type noted above and hereby incorporated by reference with butadiene or isoprene being preferred. The remaining monomer utilized to make the random block copolymer comprises vinyl substituted aromatics of the type set forth hereinabove and are also hereby fully incorporated by reference. A suitable type of aromatic monomer is styrene. The random block copolymer can be made by simultaneously feeding a mixture of monomers to a polymerization system rather than by feeding the monomers in a sequential manner. The amount of the various blocks by weight are the same as set forth above, that is from about 20 to about 70 percent by weight of vinyl substituted aromatic blocks with 40 to 60 percent by weight of such blocks being preferred. Accordingly, the amount of the diene blocks is the different. The number average molecular weight and the weight average molecular weight of the random block copolymers are the same as set forth above and accordingly are hereby fully incorporated by reference. The random block copolymers contain significant blocks of a vinyl substituted aromatic repeating unit and/or significant blocks of a conjugated diene repeating unit therein and/or blocks of random or random tapered conjugated diene/vinyl substituted aromatic. These copolymers also can be represented as by A'-B'-A'-B'- wherein A' is a block of vinyl substituted aromatic compound, B' is a block of conjugated diene, and the length of A' and B' blocks vary widely and, are substantially shorter than the A and B blocks of a normal block polymer. The amount of the aromatic a block content of the random block copolymer preferably should be in the range of about 15 to about 45, more preferably 25 to about 40 weight percent.

Examples of such commercially available random block copolymers include the various Glissoviscal block copolymers manufactured by BASF. A previous available random block copolymer was Phil-Ad viscosity improver, manufactured by Phillips Petroleum.

Regardless of whether a true or normal block copolymer or a random block copolymer, or combinations of both are utilized, they are hydrogenated before use in this invention so as to remove virtually all of their olefinic double bonds. Techniques for accomplishing this hydrogenation are well known to those of skill in the art and need not be described in detail at this point. Briefly, hydrogenation is accomplished by contacting the copolymers with hydrogen at superatomospheric pressures in the presence of a metal catalyst such as colloidal nickel, palladium supported on charcoal, etc.

In general, it is preferred that these block copolymers, for reasons of oxidative stability, contain no more than about 5 percent and preferably no more than about 0.5 percent residual olefinic unsaturation on the basis of the total number of carbon-to-carbon covalent linkages within the average molcule. Such unsaturation can be measured by a number of means well known to those of skill in the art, such as infrared, NMR, etc. Most preferably, these copolymers contain no discernible unsaturation, as determined by the aforementioned analytical techniques.

The (A) block copolymers typically have number average molecular weights in the range of about 10,000 to about 500,000 preferably about 30,000 to about 200,000. The weight average molecular weight for these copolymers is generally in the range of about 50,000 to abouty 500,000, preferably about 30,000 to about 300,000.

The unsaturated carboxylic reagent (B) generally contains an alpha-beta olefinic unsaturation. By the term alpha-beta olefinic unsaturated carboxylic acid reagent, it is meant to include alpha-beta olefinic unsaturated carboxylic acids (B) per se and functional derivatives thereof, such as anhydrides, esters, amides, imides, salts, acyl halides, and nitriles. These carboxylic acid reagents may be either monobasic or polybasic in nature. When they are polybasic they are preferably dicarboxylic acids, although tri- and tetracarboxylic acids can be used. Exemplary of the monobasic alpha-beta olefinic unsaturated carboxylic acid reagents are the carboxylic acids corresponding to the formula:

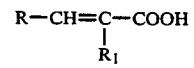

wherein R is hydrogen, or a saturated aliphatic or alicyclic, aryl, alkylaryl or heterocyclic group, preferably hydrogen or a lower alkyl group, and $R_1$ is hydrogen or a lower alkyl group. By lower alkyl it is meant from 1 to about 10 carbon atoms. The total number of carbon atoms in R and $R_1$ should not exceed 18 carbon atoms. Specific examples of useful monobasic alpha-beta olefinic unsaturated carboxylic acids are acrylic acid, methacrylic acid, cinnamic acid, crotonic acid, 2-phenylpropenoic acid, etc. Exemplary polybasic acids include maleic acid, fumaric acid, mesaconic acid, itaconic acid and citraconic acid.

The alpha-beta olefinic unsaturated reagents (B) also include functional derivatives of the foregoing acids, as noted. These functional derivatives include the anhydrides, esters, amides, imides, salts, acid halides, and nitriles and other nitrogen containing compounds of the aforedescribed acids. A preferred alpha-beta olefinic unsaturated carboxylic acid reagent (B) is maleic anhydride.

Methods of preparing such functional derivatives are well known to those of ordinary skill in the art and they can be satisfactorily described by noting the reactants used to produce them. Thus, for example, derivative esters for use in the present invention can be made by esterifying monohydric or polyhydric alcohols or epoxides with any of the aforedescribed acids. Amines and alcohols described hereinafter can be used to prepare these functional derivatives. The nitrile functional derivatives of the aforedescribed carboxylic acid useful in making the products of the present invention can be made by the conversion of a carboxylic acid to the corresponding nitrile by dehydration of the corresponding amide. The preparation of the latter is well known to those skilled in the art and is described in detail in *The Chemistry of the Cyano Group* edited by Zvi Rappoport, Chapter 2, which is hereby incorporated by reference for its relevant disclosures pertaining to methods for preparing nitriles. Specific examples of such nitrogen containing functional derivatives include maleimide and maleamic acid. More specifically, such amine functional derivatives of the alpha-beta olefinic unsaturated reagent (B) can have the formula

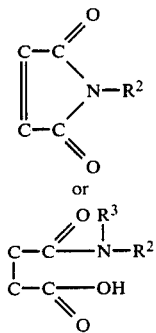

wherein $R_2$ and $R_3$, independently, can be hydrogen, an alkyl having from about 1 to about 12 carbon atoms and preferably from about 1 to about 6 carbon atoms, an alkyl substituted aromatic having from about 7 to about 12 carbon atoms and preferably from about 7 to about 9 carbon atoms, or a moiety containing N, O or S as hetero atoms. Examples of highly preferred compounds include N-(3,6-dioxaheptyl)maleimide, N-(3-dimethylaminopropyl)maleimide, and N-(2-methoxyethoxyethyl)maleimide.

Ammonium salt derivatives can also be made from any of the amines described hereinafter as well as from tertiary amino analogs of them, ammonia or its derivitives, (e.g. $NH_4Cl$, $NH_4OH$, $(NH_4)_2CO_3$, etc.) by conventional techniques well known to those of ordinary skill in the art.

The acid halide functional derivative of the aforedescribed olefinic carboxylic acids (B) can be prepared by the reaction of the acids and their anhydrides with a halogenation agent such as phosphorus tribromide, phosphorus pentachloride, or thionyl chloride. Esters can be prepared by the reaction of the acid halide with the aforesaid alcohols or phenolic compounds such as phenol, naphthol, octylphenol, etc. Also, amides and imides and other acylated nitrogen derivatives can be prepared by reacting the acid halide with the above-described amino compounds. These esters and acylated nitrogen derivatives can be prepared from the acid halides by conventional techniques well known to those of ordinary skill in the art.

It is important that an effective amount of the (B) reagent be utilized such that sufficient dispersancy is imparted to the (D) acylated reaction product. Often, an amount of (B) reagent of from about 0.20 to about 20 percent by weight and desirably from about 0.5 to about 5 percent by weight based upon the total weight of said (A) block copolymer and said (B) reagent is utilized. Generally, such amounts are sufficient to ensure that from about 0.1 percent to about 3 percent by weight of the (D) reaction product is said (B) reagent.

With regard to the solvent-free reaction, the reaction temperature between the (A) hydrogenated block copolymer and the (B) reagent will depend to some extent upon the type of block copolymer as well as the type of the initiator system utilized. Generally, the reaction temperature is from about 100° to about 300° C., desirably from about 160° and to about 260° C., preferably from about 220° to about 260° C. Although not necessary, the reaction can be carried out in an inert atmosphere such as nitrogen.

The solvent-free reaction between the hydrogenated block copolymers and the unsaturated carboxylic acids or derivatives thereof can generally take place in any suitable vessel, device or apparatus without the presence of any solvent. Desirably, the reaction occurs in a blending device such as an extruder, a Banbury, a two-roll mill, or the like.

As an optional and important aspect of the present invention, the blending device imparts high mechanical energy to such an extent that a sufficient force is applied to the (A) block copolymer chains to cause scission or breakage thereof. The use of such high mechanical energy to cause chain scission is usually not desired. However, it is optionally desired in situations wherein the molecular weight of the block copolymer is greater than desired and hence, is broken down to a suitable range or the viscous nature of the block copolymer requires a high mechanical energy mixing system for processing. Such high mechanical energy devices can be the same type of mixing devices as noted above and generally impart high torque or masticate the ingredients therein. As a side reaction, it is thought that the block copolymer chains so broken produce terminal chain ends which serve as reaction sites for the (B) reagent. Thus, besides causing actual chain scission, it is speculated that the high mechanical energy imparting devices create reaction sites in addition to those created by the (C) free radical initiators. However, it is to be understood that such chain scission creates very few reaction sites compared with the free radical reaction.

In order to promote the reaction and to create reaction sites, free radical initiators are generally utilized. Two types of such initiators include the various organic peroxides as well as the various organic azo compounds. The amount of initiators based upon the amount of the (A) block copolymers and the (B) reagent utilized is generally, from about 0.01 percent to about 5.0 percent by weight and desirably from about 0.05 percent to about 2.0 percent by weight is utilized. Typical organic peroxides include benzoyl peroxide; t-butyl peroxypivalate; 2,4-dichlorobenzoyl peroxide; decanoyl peroxide; propionyl peroxide; hydroxyheptyl peroxide; cyclohexanone peroxide; t-butyl perbenzoate; dicumyl peroxide; 2,5-dimethyl-2,5-di(t-butylperoxyl)-3-hexyne; 2,5-dimethyl-2,5-di(t-butylperoxyl)hexane; 2,5-dimethyl-2,5-dibenzoylperoxyhexane; t-butyl peroxide; cumene hydroperoxide; 2,5-dimethyl-2,5-dihydroperoxy)-hexane; t-butyl hydroperoxide; lauroyl peroxide; t-amyl perbenzoate; or mixtures thereof. Preferred organic peroxides are benzoyl peroxide, t-butyl peroxide and t-butyl perbenzoate. Mixtures of two or more of the above peroxides can also be used.

Naturally, handling of the peroxides should be done with the utmost care due to their tendency to decompose or violently react. Hence, the user should be thoroughly familiar with their properties as well as proper handling procedures before any contact therewith.

Examples of suitable organic azo initiators include 2,2'-azobis(2-methylpropionitrile) and 2,2'-azobis(2-methylvaleronitrile) and 4,4'-azobis(4-cyanovaleric acid).

The extent of the reaction of the (B) reagent such as maleic anhydride as incorporated onto the block copolymers is generally measured by a total acid number or TAN. The TAN number desirably is from about 0.1 to about 60 with from about 0.5 to about 20 being preferred. The definition of the TAN number is the mg of KOH required to neutralize the acid functional groups in one gram of the reaction product of (A) block copolymer and (B) alpha-beta olefinically unsaturated carboxylic reagent.

The (D) reaction products of the present invention are useful as intermediates as well as viscosity improvers for multigrade oils.

The present invention will be understood by reference to the following examples.

EXAMPLES I-III

Three commercial viscosity index improvers (VI improvers) were functionalized with maleic anhydride in a laboratory scale extruder. The extruder used in these experiments was a single-screw type driven by a C.W. Brabender Plasti-Corder torque rheometer. No die was used.

To insure homogeneous extruder feeds, the crumb VI improving polymer was coated with maleic anhydride and tert-butyl peroxide prior to extrusion. This was done by dissolving both maleic anhydride and tert-butyl peroxide in acetone, spraying the acetone solution evenly over the crumb polymer, and allowing the acetone solvent to evaporate. This procedure leaves only the maleic anhydride- and peroxide-coated crumb polymer behind as a residue. More specifically, a homogeneous extruder feed composed of 96.5 percent wt crumb polymer, 3.2 percent wt maleic anhydride, and 0.3 percent wt di-tert-butyl peroxide was charged to the extruder feed zone.

The reaction mixture is conveyed through the three heating zones of the extruder barrel by a single screw. The barrel length of the lab-scale extruder used herein was 18.75 inches. The residence time in each of the three zones of the extruder barrel is given by the following relationship:

$$\text{Approximate Residence Time in Each Zone} = \frac{500}{\text{RPM}} \text{ (seconds)}$$

In each of the following three examples the first zone was used only to preheat the extruder feed to a 160° C. initiation temperature. Although reaction of the components commenced, it was at a low rate with most of the reaction occurring in the last two zones. The approximate reaction times are given in the examples.

EXAMPLE I

Maleinized Shellvis 40

Extruder feed:
  760 gm Shellvis 40
  26 gm Maleic Anydride
  3 gm di-tert-Butyl Peroxide
Extruder screw speed = 75 rpm
Residence time at temperature:
  7 seconds at 160° C. (zone 1)
  7 seconds at 240° C. (zone 2)
  7 seconds at 240° C. (zone 3)
Approximate reaction time = 21 seconds
TAN 10-15

EXAMPLE II

Maleinized BASF Glissoviscal CE 5260

Extruder feed:
  626 gm Glissoviscal CE
  21 gm Maleic Anydride
  2 gm di-tert-Butyl Peroxide
Extruder screw speed = 50 rpm
Residence time at temperature:
  10 seconds at 160° C. (zone 1)
  10 seconds at 240° C. (zone 2)
  10 seconds at 260° C. (zone 3)
Approximate reaction time = 30 seconds
TAN 10-15

EXAMPLE III

Maleinized Shellvis 50

Extruder feed:
  626 gm Shellvis 50
  21 gm Maleic Anydride
  2 gm di-tert-Butyl Peroxide
Extruder screw speed = 50 rpm
Residence time at temperature:
  10 seconds at 160° C. (zone 1)
  10 seconds at 240° C. (zone 2)
  10 seconds at 260° C. (zone 3)
Approximate reaction time = 30 seconds.
TAN 10-15

In a similar manner, the same blending experiments were carried out at different temperatures as of about 160°, 180°, 200°, and 220° C.

The reaction mixture is dissolved as a 10 percent solution in toluene. It is then poured slowly into methyl alcohol with rapid agitation to precipatate the polymer. The polymer is isolated by decantation and dried in an open dish at about 60° C. Desirably, any unreacted (B) carboxylic reagent such as maleic anhydride is removed in any conventional manner such as by stripping the same in a vacuum.

An alternative process is to carry out the above reaction in the presence of one or more solvents to form the (D) acylating reaction product. The solvent used can be any common or conventional solvent such as those known to the art and literature. Convenient and suitable solvents include the various oils which are lubricant base stocks such as natural and/or synthetic lubricating oils set forth hereinbelow. Briefly, natural oils include mineral lubricating oils such as liquid petroleum oils and solvent-treated or acid-treated mineral lubricating oils of paraffinic, naphthenic or mixed paraffinic-naphthenic types. Animal and vegetable oils can also be used. Synthetic lubricating oils utilized are alkylated aromatics, poly-alpha-olefins, alkyl phosphates and the esters derived from polybasic acids, polyols and fatty acids. Examples of solvents include solvent refined 100 to about 200 Neutral mineral paraffic and/or naphthenic oils, diphenyl-dodecanes, didodecylobenzenes, hydrogenated decene oligomers, and mixtures of the above. The amount of oil should be adjusted so that the viscosity of the reaction mixture is suitable for mixing. Typically from about 70 percent to about 99 percent by weight of the total reaction mixture as oil can be utilized.

Although in this embodiment of the invention, the reactants are carried out in the presence of a solvent, the various reactants of the same are set forth hereinabove and accordingly are hereby incorporated by reference. For example, the various (A) hydrogenated block copolymers can be either the normal block copolymer set forth hereinabove containing from about 2 to about 5 total block portions or the random block copolymer. The random block copolymer can also have the same number average molecular weight range as set forth hereinabove. The unsaturated carboxylic reagent (B) is the same as set forth hereinabove and accordingly is hereby fully incorporated by reference. The reagent can thus contain alpha-beta olefinic unsaturated carboxylic acids including various functional derivatives thereof having from about 2 to about 20 carbon atoms exclusive of the carboxyl-base groups. The (C) initiators are also the same as set forth hereinabove with regard to the solvent-free reaction and accordingly are hereby incorporated by reference and include the organic peroxides and the various organic azo compounds. The various reaction parameters, conditions, methods and the like are also the same as set forth hereinabove and are also hereby fully incorporated by reference unless otherwise stated below to be different.

The preparation of the (D) acylating reaction product generally conforms to the procedure set forth above except that a solvent, for example a Neutral mineral oil is utilized. Any conventional or suitable reaction vessel or container is utilized such as a reaction flask. The mineral oil is initially added to the reaction vessel in a desired amount and heated. Inasmuch as the reaction is desirably carried out in an inert atmosphere, the vessel can be initially purged with an inert gas such as nitrogen. Longer resident times are generally required to react the generally larger amount of reactants contained in the reaction vessel. Thus, although the temperatures can be from about 100° C. to about 300° C., they are desirably somewhat lower as from about 130° C. to about 180° C. with from about 140° C. to about 175° C. being preferred. The process is generally carried out by heating the solvent to a suitable reaction temperature. The (A) block copolymer is then added and allowed to dissolve over a matter of hours as for example a few hours. The (B) alpha-beta olefinic unsaturated carboxylic reagent is then added. The (C) free radical initiator is subsequently added and the reaction conducted at a suitable temperature, as for example from about 140° to about 170° C. Desirably, the initiator is added in a slow manner, for example dropwise, over a period of time as many minutes and even hours. Upon completion of the addition of the (C) initiator, the solvent is held at the reaction temperature for a period of time until a desired yield is obtained, typically for about ½ to about 2 hours. Naturally, much shorter or greater periods of time can be utilized. The (D) acylating reaction product so produced can be utilized as a viscosity improver or as an intermediate for further reaction with a (E) primary amine-containing compound.

The invention will be better understood by reference to the following examples.

EXAMPLE IV

A 1750 g sample of a hydrogenated styrene/butadiene copolymer (BASF Glissoviscal CE5260) is changed to a 12-1 flask containing 5250 g Sun HPO 100N oil which has been heated to 150° C. During this step and throughout the entire reaction sequence, a $N_2$ blanket and mechanical stirring are maintained. Within 3 hrs. a homogeneous solution is obtained. Thirty-five (35 g) grams of maleic anhydride is charged to the flask and thoroughly dissolved while increasing the reaction temperature to 160° C. A dropwise addition of 14.1 g of the t-butyl peroxide initiator is charged into the reaction mixture over 1 hour. The solution is stirred at 160° C. for 1.5 additional hours. The $N_2$ blanket is then changed to a subsurface purge (2.0 SCFH). The reaction mixture is heated to 170° C. and held 2.0 hours to remove unreacted maleic anhydride and peroxide decomposition products. Infrared assay of the polymer solution confirms the presence of succinic anhydride groups in the product. Treatment of a 50 g aliquot of product with 0.1 g DETA (Diethylenetriamine) at 110° C. causes instantaneous gelation. This confirms that on the average each polymer molecule contains more than one succinic anhydride group. Titration of a toluene solution of the product, with 0.1N $NaOCH_3$, indicates a TAN=5.4 (95% maleic anhydride reacted). Dialysis of the polymer solution shows that 20-30% of the TAN is succinic anhydride attached to the polymer substrate, while 70-80% of the TAN is succinic anhydride attached to the 100N oil.

EXAMPLE V

In a similar manner, a reaction product is prepared utilizing Shellvis 40, a hydrogenated styrene-isoprene block copolymer produced by Shell Chemicals. The amount of Shellvis 40 is 10.0% by weight, the amount of maleic anhydride is 0.50 weight percent and the amount of neutral oil is 89.5 weight percent. These components are charged to a flask in a manner as set forth in Example IV and heated while a dropwise addition of 0.5 weight percent of t-butyl peroxide is charged over a period of 1 hour. The solution is stirred at 160° C. for an additional 1.5 hours. The nitrogen blanket is then changed to a subsurface purge. The reaction mixture is heated to 170° C. and held for 2 hours to remove unreacted maleic anhydride and peroxide of composition products. Infrared assay of the polymer solution confirms the presence of succinic anhydride groups in the product. Treatment of a 50 g aliquot of product with 0.1 g of diethylenetriamine at 110° C. causes a dramatic viscosity increase thus confirming that a significant amount of succinic anhydride groups are attached to the polymer substrate. The TAN was 5.4 (theoretical 5.5). The number average molecular weight is approximately 160,000 and the weight average molecular weight is approximately 200,000.

EXAMPLE VI

In a manner similar to example IV, a reaction product is prepared utilizing Shellvis 50, a hydrogenated styrene-isoprene block copolymer produced by Shell Chemicals, with a lower molecular weight than Shellvis 40. The amount of Shellvis 50 is 14.9 weight percent, the amount of maleic anhydride is 0.3% and the amount of 100 Neutral oil is 84.8 weight percent. The reactants are heated in a manner as set forth in Example IV and then 0.2 weight percent of t-butyl peroxide initiator is charged to the reaction mixture over a period of 1 hour and the solution is stirred at 160° C. for an additional 1.5 hours. As before, the nitrogen blanket is changed to a subsurface purge. The reaction mixture is heated at 170° C. and held for 2 hours to remove unreacted maleic anhydride and peroxide decomposition products. Infrared assay of the polymer solution confirms the presence of succinic anhydride groups in the product. Treatment of a 50 g aliquot of product with 0.1 g of diethylenetriamine at 110° C. causes a significant viscosity increase. This confirms that a significant amount of succinic anhydride groups are attached to the polymer. The TAN was 3.5 (theoretical 3.4) and the polymer solution was clear.

Regardless of whether a solvent-free process is utilized as carried out in an extruder or other apparatus or whether a solution process is utilized, the (D) reaction product is reacted with a (E) primary amine-containing compound. By the term "primary amine-containing compound" is meant ammonia or a compound which contains only one primary amino group therein. That is, although the compound can contain a plurality of nitrogen atoms therein, only one such nitrogen atom forms a primary amine group. Otherwise, undesirable gel is often obtained.

The (E) primary amine-containing compounds of the present invention can broadly be represented by the formula R-NH$_2$ where R is hydrogen, an alkyl, a cycloalkyl, an aromatic, and combinations thereof, e.g. an alkyl substituted cycloalkyl. Furthermore, R can be an alkyl, an aromatic, a cycloalkyl group, or combination thereof containing one or more secondary or tertiary amine groups therein. R can also be an alkyl, a cycloalkyl, an aromatic group, or combinations thereof containing one or more heteroatoms (for example oxygen, nitrogen, sulfur, etc.). R can further be an alkyl, a cycloalkyl, an aromatic, or combinations thereof containing sulfide or oxy linkages therein. Generally, R is hydrogen or said various R groups containing from 1 to about 25 carbon atoms with from about 1 to about 6 or 7 carbon atoms being desirable. Exemplary of such (E) primary amine-containing compounds are the following wherein R is as set forth immediately herein above: ammonia, N,N-dimethylhydrazine, methylamine, ethylamine, butylamine, 2-methyoxyethylamine, N,N-dimethyl-1,3-propanediamine, N-ethyl-N-methyl-1,3-propanediamine, N-methyl-1,3-propanediamine, N-(3-aminopropyl)morpholine, 3-alkoxypropylamines wherein the alkoxy group contains from 1 to 18 carbon atoms, usually an alkoxy group having from 1 to 8 carbon atoms and has the formula R$^1$—O—CH$_2$CH$_2$CH$_2$—NH$_2$, such as 3-methoxypropylamine, 3-isobutyoxypropylamine and 3-(alkoxypolyethoxy)-propylamines having the formula R$^1$O(CH$_2$CH$_2$O)$_x$CH$_2$CH$_2$CH$_2$NH$_2$ wherein the alkoxy group is as immediately set forth above and where x is 1 to 50, 4,7-dioxaoctylamine, N-(3-aminopropyl)-N$^1$-methylpiperazine, N-(2-aminoethyl)piperazine, (2-aminoethyl)-pyridines, aminopyridines, 2-aminomethylpyridines, 2-aminomethylfuran, 3-amino-2-oxotetrahydrofuran, N-(2-aminoethyl)pyrrolidine, 2-aminomethypyrrolidine, 1-methyl-2-aminomethylpyrrolidine, 1-aminopyrrolidine, 1-(3-aminopropyl)-2-methypiperidine, 4-aminomethylpiperidine, N-(2-aminoethyl)morpholine, 1-ethyl-3-aminopiperidine, 1-aminopiperidine, N-aminomorpholine, and the like.

Of these compounds, N-(3-aminopropyl)morpholine and N-ethyl-N-methyl-1,3-propanediamine are preferred with N,N-dimethyl-1,3-propanediamine being highly preferred.

Another group of (E) primary amine-containing compounds are the various amine terminated polyethers. A specific example of such a polyether is given by the formula

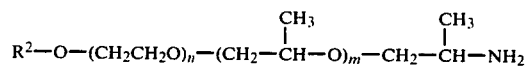

wherein n is from about 0 to about 50 with from about 5 to about 25 being preferred, m is from about 0 to about 35 with from about 2 to about 15 being preferred, and R$^2$ is an alkyl having from about 1 to about 18 carbon atoms.

The reaction between the (E) primary amine-containing compound and the (D) acylating reaction product can be carried out free of solvent or in a solvent system such as in a lubricating oil.

In the formation of the (D) reaction product, any suitable vessel or device can be utilized such as an extruder, a Banbury, or the like. The blending device desirable imparts a suitable high mechanical energy to the compounds, that is the (D) acylating reaction product and the (E) primary amine-containing compound, such that a solvent-free reaction can be conducted with good mixing of the components. The reaction between the (D) acylating reaction product and the (E) primary amine-containing compound generally takes place upon heating and is from about 50° to about 250° C. with from about 140° to about 180° C. being preferred. Desirably, the reaction takes place in the presence of an inert gas such as nitgrogen or argon. The time to carry out the reaction generally depends on the reaction temperature, desired yield and the like. When a blending device such as an extruder is utilized having a relatively small amount reactants therein, the reaction time is generally quite short.

The reaction with the (E) primary amine-containing compound can also be carried out in the presence of one or more solvents. The solvent utilized in the solvent or solution-type reaction can be any common or conventional solvent known to the art or literature. More specifically, the solvent can be the same as set forth hereinabove with regard to the solvated formation of the (D) acylating reaction product. That is, conventional oils generally of lubricating viscosity such as natural and/or synthetic lubricating oils set forth hereinabove can be utilized. A more detailed description of such oils is also set forth hereinbelow. Generally, a neutral lubricating oil is utilized.

The solvent, e.g. lubricating oil, can be added to the reaction vessel, heated and the (D) acylating reaction product added thereto. The (E) primary amine-containing compound can then be added. Although this order of addition is somewhat desirable., it can be varied. Another source of oil is to utilize the solution of (D) acylating reaction product which is carried out in a substantial amount of oil.

The reaction conditions of the (D) acylating reaction product with the (E) primary amine-containing compound in a solution are essentially the same as that set forth hereinabove with regard to the solvent-free reaction conditions. However, the temperature of reaction is from about 50° C. to about 250° C. and perferably from about 150° C. to 190° C. The reaction is carried out desirably in an inert gas. The amount of the various reactants is also the same as set forth hereinabove.

In any event, it is an important aspect of the present invention that essentially only (E) primary amine-containing compounds be utilized, that is compounds which contain only one primary amine group therein as described hereinabove.

An effective amount of the (E) primary amine-containing compound is utilized so that an oil-soluble dispersant VI improver is formed. Generally, an amount of the (E) primary amine-containing compound is utilized such that from about 0.1 to about 3.0 primary amine groups exist for each two carbonyl groups or for each anhydride group of said (D) acylating reaction product. Desirably from about 0.5 to about 1.5 primary amine-containing groups exist for each two carbonyl groups or each anhydride group and preferably from about 0.9 to about 1.1 primary amine groups for each two carbonyls or each anhydride group. Naturally, higher or lower amounts can be utilized but tend to be inefficient and/or costly.

The invention will be better understood by reference to the following examples.

EXAMPLE VII

A 3000 g sample of the 24.9% polymer solution prepared in Example IV is charged to a 12-1 flask equipped with a mechanical stirrer, thermometer, $N_2$ inlet, addition funnel, Dean-Stark water trap, condenser, and heating mantle. Wibarco Heavy Alkylate (Wibarco Gmbh; 3212.9 g) is charged and the mixture is stirred and heated to 150° C. under a $N_2$ blanket to obtain a homogeneous solution (approx. 2.0 hrs.). When this solution has been obtained, 14.9 g of N,N-dimethyl-1,3-propanediamine (Eastman Kodak Co.) is added dropwise to the mixture from the addition funnel over 0.5 hour. After all the amine has been charged, the reaction mixture is heated to 170° C. and held 3.0 hours. The $N_2$ blanket is changed to a subsurface purge (1.0 SCFH) over the last hour of the reaction period to remove by-product water. This 12% weight polymer solution is the final product. Analytical assay of the final product gives an ANA nitrogen content of 0.065%. Infrared analysis of the product confirms imide formation with no residual anhydride absorptions. The kinematic viscosity at 100° C. of this dispersant-VI concentrate is 240 cSt.

An API SF/CC,SAE 15W40 oil was prepared by blending 12.5% weight of the final product from Example VII, 10.6% weight of performance additive A$^{(a)}$, 0.4% weight Acryloid 156, in a lubricating oil base stock. This oil thereby contains 1.5% weight of the product co-polymer. When evaluated in the Caterpillar 1G-2 engine test a TGF=73; WTD=217.6 rating is observed after a 480 hour test period.

An API SF/CC, SAE 10W30 oil was prepared by blending 11% weight of the product dispersant-VI, 8.45% weight of Performance Additive B$^{(b)}$, 0.2% weight Acryloid 156 in a lubricating oil base stock. This oil thus contains 1.32% weight of the product copolymer. When evaluated in the Ford Sequence VD engine test, a merit rating of 9.5 sludge, 7.2 varnish and 6.8 piston skirt varnish is achieved after 192 test hours.

(a) Performance additive A: %SA=13.44, %Zn=1.12, %P=1.02, %Ca=2.04, %Mg=0.99, %N=0.25, %S=3.47, TBN=96.9.

(b) Performance Additive B: %SA=12.29, %Zn=1.56, %P=1.41, %Ca=1.23, %Mg=1.16, %N=0.52, %S=4.27, TBN=85.8.

EXAMPLE VIII

In a manner similar to Example VII, 5500 g of the 10% w polymer solution prepared in Example V is charged to a reactor. Diphenylalkane (Vista Chemical Co.; 2332.1 g) is charged and the mixture stirred and heated to 150° C. under a $N_2$ blanket. Once a homogeneous solution has been obtained, 27.3 g of N,N-dimethyl-1,3-propanediamine (Eastman Kodak Co.) is added dropwise to the mixture over 0.5 hours. After all the amine has been charged, the reaction mixture is heated to 170° C. and held for 3.0 hours. The nitrogen blanket is changed to a subsurface purge over the last hour of the reaction period to remove byproduct water and yield a final product. Analytical assay of the final product gives an ANA nitrogen content of 0.094 (0.094 theorectical). Infrared analysis of the product confirms imide formation with no residual anhydride absorptions. The kinematic viscosity at 100° C. of this dispersant-VI concentrate is 4353 cSt. The product is clear.

An API SF/CC, SAE 10W30 oil is prepared by blending 9.5%W of the product dispersant-VI, 4.2% weight of performance additive C$^{(c)}$, in a lubricating oil base stock. This oil thus contains 0.67% weight of the product copolymer. When evaluated in the Ford Sequence VD engine test, a merit rating of 9.55 sludge, 7.1 varnish, 6.7 piston skirt varnish is achieved after 192 test hours.

(c) Performance additive C: %SA=17.4, %Zn=2.45, %P=2.21 %Ca=1.36, %Mg=0.87, %N=0.62, %S=6.22, TBN=115.9 %Na=1.56

EXAMPLE IX 7000 g of the 14.9% polymer solution prepared in Example VI was charged to a flask equipped in a manner as set forth in Example VII. 6067 g Wibarco Heavy Alkylate (Wibarco GmbH) is added and the mixture is heated to 150° C. Once a homogeneous solution is obtained, 22.5 g of N,N-dimethyl-1,3-propanediamine was added dropwise over a ½ hour period. After all the amine had been charged, the reaction vessel is heated to 170° C. and held for 3.0 hours. The nitrogen blanket is changed to a subsurface purge over the last hour of the reaction period to remove byproduct water. The 8.0% weight polymer solution gives the final product. Analytical assay of this final product gives an ANA nitrogen content of 0.05% (0.05% theoretical) Infrared analysis of the product confirms imide formation with no residual anhydride absorbtions. The appearance of the concentrate was clear.

EXAMPLE X

A maleic anhydride functionalized solvent free polymer as obtained from Example II is reacted with a primary amine compound in the following manner; the solvent free polymer in an amount of 2 carbonyl equivalents (based upon the TAN number) is reacted with one equivalent of a primary amine group in the same type of extruder, that is a single screw type extruder driven by a C. W. Brabender Plastic-Corder torque rheometer. The temperature of the extruder is approximately 160° C. The primary amine containing compound, N,N-dimethyl-1,3-propanediamine in the above noted amount was premixed with the solvent free polymer and both added to the feed portion of the extruder. Residence time of the extruder was approximately 20 seconds. The imidized neat polymer in an amount of 12% by weight was disolved into Wibarco Heavy Alkylate. The kinematic viscosity at 100° C. of the dispersant-VI concentrate was 760cSt.

Should relatively small amounts of polyamines containing two or more primary amino groups be utilized to react with the (D) acylating reaction product containing an acid group or anhydride group, viscosity of the product increases dramatically and gel is often formed thereby yielding an insoluble material. However, it is possible that polyamines, containing two or more primary amino groups can be utilized to manufacture an oil soluble effective VI improver/dispersant product. This depends upon the functionality of the polyamine and the (D) acylating reaction product.

The gel formation point is theroretically predicted by mathematical formulas as set forth in Prof. George Odian's textbook, "Principles of Polymerization. 2nd Edition," pp. 96–107, 1970, McGraw Hill Book Co., New York, N.Y. which is hereby fully incorporated by reference.

Accordingly, assume that diethylene triamine (DETA) is used as a polyamine to react with the (D) acylating reaction product. DETA has the functionality of two because it contains two primary amino groups per molecule. If the number average functionality of the (D) acylating reaction products is two or less, the theory predicts that no gel, a crosslinked product, would be formed. If said functionality, however, is greater than two, a gel is predicted to form. The theories teach that the greater the functionality, the greater the gelation. Even if the functionally is two or less, the oil-soluble product can be undesirable because the viscosity will be increased excessively in many cases.

The number of the anhydride groups attached to each molecule of (D) depends upon the average molecular weight of the (A) block copolymer and the TAN of (D) copolymer. The following table illustrates this aspect.

| TOTAL ACID NUMBER (TAN) OF (D) | | | | | | |
|---|---|---|---|---|---|---|
| | Total Acid Number (TAN) of (D) | | | | | |
| Number average mol. wt. of (A) | $f_d = 1$ | $f_d = 1.5$ | $f_d = 2$ | $f_d = 5$ | $f_d = 10$ | $f_d = 20^a$ |
| 50,000 | 2.2 | 3.4 | 4.5 | 5.6 | 22 | 44 |
| 70,000 | 1.6 | 2.4 | 3.2 | 4.0 | 16 | 32 |
| 100,000 | 1.12 | 1.7 | 2.2 | 2.8 | 11 | 22 |
| 150,000 | 0.75 | 1.1 | 1.5 | 1.9 | 7.5 | 15 |
| 200,000 | 0.56 | 0.84 | 1.1 | 1.4 | 5.6 | 11.2 |
| 300,000 | 0.37 | 0.56 | 0.75 | 0.93 | 3.7 | 7.5 |

$^a f_d$ = Number average functionality of (D): the average number of anhydride groups attached to each polymer molecule On the other hand, a compound (E) containing only one primary amine group as set forth above, will form an oil soluble product regardless of the functionality of (D).

According to the present invention, it is required that the VI improvers/dispersants of the present invention be oil-soluble so that they can be utilized in various lubricating applications as set forth hereinbelow. As illustrated of this fact, examples are presented showing the criticality of utilizing essentially only compounds containing one primary amine group therein.

As previously indicated, the products of the present invention are suitable as VI improvers/dispersants. Accordingly, the ciomposition of the present invention can be effectively employed in a variety of lubricating compositions formulated for a variety of uses. These lubricating compositions are based on diverse oils of lubricating viscosity, including natural and synthetic lubricating oils and mixtures thereof. These lubricating compositions containing the subject additive concentrates are effective as crankcase lubricating oils for spark-ignited and compression-ignited internal combustion engines, including automobile and truck engines, two-cycle engines, aviation piston engines, marine and low-load diesel engines, and the like. Also, automatic transmission fluids, transaxle lubricants, gear lubricants, metal-working lubricants, hydraulic fluids, and the other lubricating oil and grease compositions can benefit from the incorporation of the subject additive concentrates.

Another aspect of the present invention relates to the utlization of a (F) polyamine in association with a (G) mono-functional acid to further extend the (D) acylating reaction product. As noted above, the reaction product (D) can be made either by a solvent process, a desired route, or in a solvent-free environment. Similarly, the reaction with the polyamine and the mono-functional acid can desirably be carried out in a solvent medium or in a solvent-free environment. It is an important aspect of the present invention to utilize an effective amount of the mono-functional acid in association with the polyamines to manufacture desirable gel-free oil soluble products. The reaction with polyamines is desirable in that they impart dispersant properties to the compound and when such a compound is added to a hydrocarbon oil, aid in controlling the thickening of the oil. In addition to the (F) polyamine and the (G) mono-functional acid, (E) primary amine containing compounds can also be utilized. However, it is essential to the present invention that a (F) polyamine and a (G) mono-functional acid be utilized at an appropriate ratio and in an appropriate amount to permit chain extension and to produce a gel-free product.

By the term "polyamine", it is meant an amine compound having at least two amino groups therein with each said group having at least one active hydrogen thereon. Thus, the polyamine can contain two or more primary amino or one or more secondary amino groups therein.

A suitable (F) polyamine compound which can be utilized are the alkylene polyamines including polyalkylene polyamines. The alkylene polyamines include those conforming to the formula

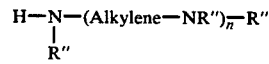

wherein n is from 1 to about 10; each R" is independently a hydrogen atom, or a hydrocarbyl group having up to about 30 atoms, and the "Alkylene" group has from about 1 to about 10 carbon atoms but the preferred alkylene is ethylene or propylene. Especially desirable are the alkylene polyamines where each R" is hydrogen with the ethylene polyamines and mixtures of ethylene polyamines being the most desirable. Usually n will have an average value of from about 2 to about 7. Such alkylene polyamines include methylene polyamine, ethylene polyamines, butylene polyamines, propylene polyamines, pentylene polyamines, hexylene polyamines, heptylene polyamines, etc. The high homologs of such amines and related aminoalkyl-substituted piperazines are also included.

Alkylene polyamines useful in preparing the dispersant-viscosity modifier compositions of the present invention include ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimetylene)triamine, N-(2-aminoethyl)piperazine, 1,4-bis(2-aminoethyl)piperazine, and the like. Higher homologs as are obtained by condensing two or more of the above-illustrated alkylene amines are useful as (a) as are mixtures of two or more of any of the aforedescribed polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Secional Edition, Kirk and Othmer, Volume 7, pages 27-39, Interscience Publishers, Division of John Wiley and Sons, 1965, which is hereby incorporated by reference for their disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. Quite satisfactory products can also be obtained by the use of pure alkylene polyamines.

Other useful types of polyamine mixtures are those resulting from stripping of the above-described polyamine mixtures. In this instance, lower molecular weight polyamines and volatile contaminants are removed from an alkylene polyamine mixture to leave a residue what is often termed "polyamine bottoms". In general, alkylene polyamine bottoms can be characterized as having less than two, usually less than one percent (by weight) material boiling below about 200° C. In the instance of ethylene polyamine bottoms, which are readily available and found to be quite useful, the bottoms contain less than about two percent (by weight) total diethylene triamine (DETA) or triethylene tetramine (TETA). A typical sample of such ethylene polyamine bottoms obtained from the Dow Chemical Company of Freeport, Texas designated "E-100" showed a specific gravity at 15.6° C. of 1.0168, a percent nitrogen by weight of 33.15 and a viscosity at 40° C. of 121 centistokes. Gas chromatography analysis of such a sample showed it to contain about 0.93 percent "Light Ends" (DETA), 0.72 percent TETA, 21.74 percent tetraethylene pentamine and 76.61 percent pentaethylene hexamine and higher (by weight). These alkylene polyamine bottoms include cyclic condensation products such as piperazine and higher analogs of diethylene triamine, triethylene tetramine and the like.

When reacted with the aforedescribed (D) acylating reaction products, these polyamine bottoms often provide carboxylic derivative compositions which impart improved viscosity modifying properties to lubricants containing them. While not being bound to any particular theory or concept, it is believed that these improved viscosity properties are due to coupling of the (D) acylating reaction products through the polyamines bottoms which contain both longer molecules and an excess of reactive amino groups when compared to their lower molecular weight analogs such as triethylene tetramine.

These alkylene polyamine bottoms can be reacted solely with the (D) acylating reaction products in the presence of said (G) monofunctional acid in which case the amino reactant consists essentially of alkylene polyamine bottoms, or they can be used with other amines and polyamines. In these latter cases, at least one amino reactant comprises alkylene polyamine bottoms.

Another group of (F) polyamine compounds which can be utilized for reaction with the (G) mono-functional acids and the (D) acylating reaction product are the branched polyalkylene polyamines. The branched polyalkylene polyamines are polyalkylene polyamines wherein the branched group is a side chain containing on the average at least one nitrogen-bonded aminoalkylene

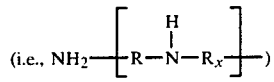

group per nine amino units present on the main chain, for examples, 1-4 of such branched chains per nine units on the main chain, but preferably one side chain unit per nine main chain units. Thus, these polyamines contain at least three primary amino groups and at least one tertiary amino group.

These reagents may be expressed by the formula:

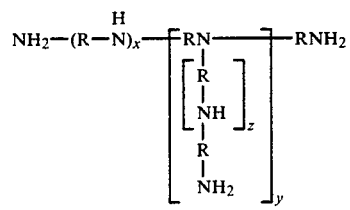

wherein R is an alkylene group having from 2 to 20 carbon atoms, such as ethylene, propylene, butylene and other homologues (both straight chained and branched), etc., but preferably ethylene; and x, y and z are integers, x being for example, from 4 to 24 or more but preferably 6 to 18, y being for example 1 to 6 or more but preferably 1 to 3, and z being for example 0-6, preferably 0-1. The x and y units may be sequential, alternative, orderly or randomly distributed.

The preferred class of such polyamines includes those of the formula

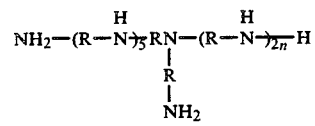

wherein n is an integer, for example, 1-20 or more but preferably 1-3, wherein R is preferably ethylene, but may be propylene, butylene, etc. (straight chained or branched).

The preferred embodiments are presented by the following formula:

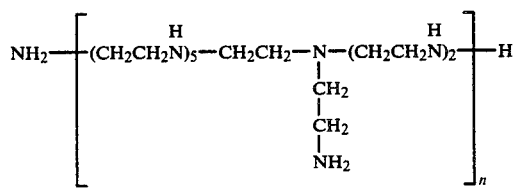

where n=1-3.

The radicals in the brackets may be joined in a head-to-head or a head-to-tail fashion. Compounds described by this formula wherein n=1-3 are manufactured and sold as Polyamines N-400, N-800, N-1200 etc. Polyamine N-400 has the above formula wherein an average number of n=1.

U.S. Pat. Nos. 3,200,106 and 3,259,578 are expressly incorporated herein by reference for their disclosure of how to make such polyamines and processes for reacting them with carboxylic acid acylating agents since analogous processes can be used with the acylating reagents of this invention.

Still another class of suitable (F) polyamine compounds include the polyoxyalkylene polyamines, e.g., polyoxyalkylene diamines and polyoxyalkylene triamines, having average molecular weights ranging from about 200 to 4000, preferably from about 400 to 2000. Illustrative examples of these polyoxyalkylene polyamines may be characterized by the formula:

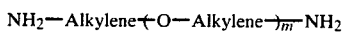

$$NH_2-Alkylene-(O-Alkylene)_m-NH_2$$

where m has a value of about 3 to 70 and preferably about 10 to 35.

$$R-[Alkylene-(O-Alkylene)_n-NH_2]_{3-6}$$

where n is such that the toal value is from 1 to 40 with the proviso that the sum of all of the n's is from about 3 to about 70 and generally from about 6 to about 35 and R is a polyvalent saturated hydrocarbon radical of up to 10 carbon atoms having a valence of 3 to 6. The alkylene groups may be straight or branched chains and contain from 1 to 7 carbon atoms, and usually from 1 to 4 carbon atoms. The various alkylene groups present within the two immediately proceeding formulae may be the same or different.

More specific example of these polyamines include:

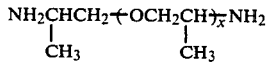

wherein x has a value of from 3 to 70 and preferably from about 10 to 35 and

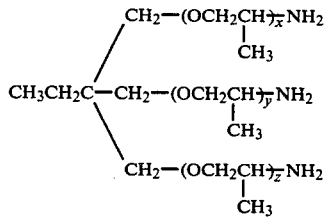

wherein x+y+z have a total value ranging from about 3 to 30 and preferably from about 5 to 10.

When used, desirable polyoxyalkylene polyamines for purposes of this invention include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "JEFFAMINES D-230, D-400, D-1000, D-2000, T-403 etc." Moreover, U.S. Pat. No. 3,804,763 and 3,948,800 are expressly incorporated herein by reference for their disclosure of such polyoxyalkylene polyamines and process for cylating them with carboxylic acid acylating agents which processes can be applied to their reaction with the acylating reagents of this invention.

Although the above noted polyamines are generally preferred, various other polyamine compounds can be utilized in the present invention. Such compounds are set forth in U.S. Pat. No. 4,234,435, to Meinhardt et al which is hereby fully incorporated by reference with regard to such various polyamines, and to the preparation thereof.

The (G) mono-functional acids which can be utilized in the present invention can generally be any carboxylic acid acylating agent or any hydrocarbon-based monocarboxylic acid wherein the definition of "hydrocarbon-based" is as set forth hereinbelow. Such monocarboxylic acids are saturated or unsaturated acids having from about 1 to about 50 carbon atoms with from about 8 to about 20 carbon atoms being preferred. Desirably, the acids are usually saturated. Examples of such specific acids include octanoic acid, decanoic acid, lauric acid, myristic acid, palmitic acid, stearic acid, and the like. Additionally, polycarboxylic acids can be utilized only when they form a cyclic imide compound. Thus, succinic acids, glutaric acids, maleic acids, itaconic acids, phthalic acids, and the like can also be utilized.

As used herein, the terms "hydrocarbon-based", "hydrocarbon-based substituent" and the like denote a substituent having a carbon atom directly attached to the remainder of the molecule and having predominantly hydrocarbyl character within the context of this invention. Such substituents include the following:

(1) hydrocarbon substituents, that is aliphatic (e.g., alkyl or alkenyl), alicyclic (e.g., cycloalkyl, cycloalkenyl) substituents, aromatic-, aliphatic-, and alicyclic-substituted aromatic nuclei and the like as well as cyclic substituents wherein the ring is completed through another portion of the molecule (that is, any two indicated substituents may togehter form an alicyclic radical);

(2) substituted hydrocarbon substituents, that is, those substituents containing non-hydrocarbon radicals which, in the context of this invention, do not alter the predominantly hydrocarbyl substituent; those skilled in the art will be aware of such radical (e.g., halo(especially chloro and fluoro)), alkoxyl, mercapto, alkylmercapto, nitro, nitroso, sulfoxy, etc.;

(3) hetero substituents, that is substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as e.g., pyridyl, furanyl, thiophenyl, imidazolyl, etc., are exemplary of these hetero substituents.

More desirably, carboxylic acid acylating agents are utilized. Such carboxylic acid acylating agents are known to the art and to the literature as for example U.S. Pat. Nos. 3,219,666; 3,272,746; 3,381,022; 3,254,025; 3,278,550; 3,288,714; 3,271,310; 3,373,111; 3,346,354; 3,272,743; 3,374,174; 3,307,928; 3,394,179; and the like which are hereby fully incorporated by reference with regard to their disclosure and preparation thereof. Such carboxylic acid acylating agents are generally prepared by reacting an olefin, an olefin polymer or chlorinated analog thereof with an unsaturated carboxylic acid or derivative thereof such as acrylic acid, fumaric acid, maleic anhydride and the like. Often they are polycarboxylic acylating agents such as hydrocarbyl-substituted succinic acids and anhydrides. These acylating agents have at least one hydrocarbyl-based substituent of from about 3 to about 1000 carbon atoms, generally from about 8 to about 500 and preferably from about 12 to about 500 carbon atoms. As used herein, the terms "hydrocaron-based", "hydrocarbon-based substituent" and the like refer to a substituent having a carbon atoms directly attached to the remainder of the molecule and having predominately hydrocarbyl character as defined herein above which include hydrocarbon substituents, substituted hydrocarbon substituents, and heterosubstituents. In general, no more than about three heteroatoms and preferably no more than one, will be present for each ten carbon atoms in the hydrocarbon-based substituents. Typically, there will be no such heteroatoms in the hydrocarbon-based substituent and it will therefore, be purely hydrocarbyl.

In general, the hydrocarbon-based substituents present in the acylating agents used in this invention are free from acetylenic unsaturation. Ethylenic unsaturation, when present, will generally be such that there is not more than one ethylenic linkage present for every ten carbon-to-carbon bonds in the substituent. The substituents can be completely saturated and therefore contain no ethylenic unsaturation.

As noted above, the hydrocarbon-based substituents present in the acylating agents of this invention may be derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, 1-butene, isobutene and 1-octene or polyolefinic monomers (usually di-olefinic monomers such as 1,3-butadiene and isoprene). Usually these monomers are terminal olefins, that is, olefins characterized by the presence of the group =C=CH$_2$. However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para-tertiarybutyl-phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as 1,3-butadiene and styrene or paratertiarybutylstyrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins of 2 to 6 carbon atoms, especially those of 2 to 4 carbon atoms.

Specific examples of terminal and medial olefin monomers which can be used to prepare the olefin polymers from which the hydrocarbon-based substituents are derived include ethylene, propylene, 1-butene, 2-butene, isobutene, 1-pentene, 1-hexene, 1-heptene, 1-octene, 1-nonene, 1-decene, 2-pentene, propylene tetramer, diisobutylene, triisobutylene, 1,2-butadiene, 1,3-butadiene, 1,2-pentadiene, 1,3-pentadiene, isoprene, 1,5-hexadiene, 2-chloro-1,3-butadiene, 2-methyl-1-heptane, 3-cyclohexyl-1-butene, 3,3-dimethyl-1-pentene, styrene, vinyl acetate, allyl alcohol, 1-methylvinyl acetate, acrylonitrile, ethyl acrylate, ethyl vinyl ether and methyl vinyl ketone. Of these, the purely hydrocarbyl monomers are more typical and the terminal olefin monomers are especially typical.

Often the olefin polymers are poly(isobutene)s such as obtained by polymerization of a C$_4$ refinery stream having a butene content of about 35 to about 75 percent by weight and an isobutene content of about 30 to about 60 percent by weight in the presence of a Lewis acid catalyst such as aluminum chloride or boron trifluoride. These polyisobutenes contain predominantly (that is, greater than 80% of the total repeat units) isobutene repeat units of the configuration.

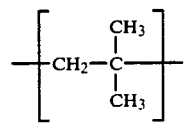

Typically, the hydrocarbyl-based substituent in the carboxylic acid acylating agent as used in the present invention is a hydrocarbyl, alkyl or alkenyl group of about 3 to about 1000 carbon atoms which can be represented by the indicia "hyd". Useful acylating agents include substituted succinic acid agents containing hydrocarbyl-based substituents having a number average of from about 12 to about 500 carbon atoms.

Often the (G) monofunctional acids used in making the solubilizers are substituted succinic acids or derivatives thereof which can be represented by the formula:

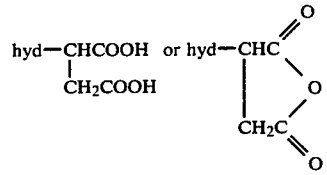

Succinic acid is a monofunctional acid because of its stoichiometric as shown below.

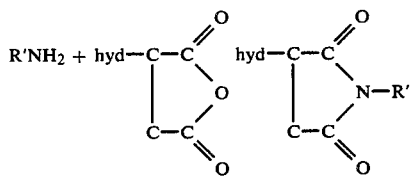

Such succinic acid acylating agents can be made by the reaction of maleic anhydride, maleic acid, or fumaric acid with the afore-described olefin, olefin polymer, or chlorinated analogs thereof as is set forth in the patents cited above. Generally, the reaction involves merely heating the two reactants at a temperature of about 150° C. to about 300° C. Mixtures of the afore-said polymeric olefins, as well as mixtures of the unsaturated mono- and dicarboxylic acids can also be used.

The reaction of the (F) polyamine and the (G) monofunctional acid with the (D) acylating reaction product generally takes place by heating as from about 50° C. to about 250° C. and desirably from about 140° C. to about 180° C. Optionally, the reaction can take place in an inert atmosphere such as nitrogen. The reaction time will naturally vary upon the reaction temperature, the desired yield and the like. Since water is generated during the reaction, it can be removed by any conventional manner.

The total amount of carbonyl groups including those in the (D) acylating reaction product and the (G) monofunctional carboxylic acid for each primary amine group of the (F) polyamine is such that an undue viscosity increase is not produced. Generally, when succinic acid type compounds are utilized, the ratio of the total number of carbonyl groups for each primary amine group is from about 0.5 to about 8, desirably from about 1 to about 4, preferably from about 1.8 to about 2.2 with a highly preferred amount being about 2. When the (G) mono-functional acid is a monocarboxylic acid, the above ratios are reduced by a factor of one half; that is, the preferred ration of monocarboxylic acids for each amine group is 1.0 since each amine group can react with each monofunctional acid. Moreover, unlike succinic acid, the monocarboxylic acid can react with both primary and secondary amines. Although higher or lower amounts of acid can be utilized, they tend to be inefficient and/or costly. The aount of the (G) monofunctional carboxylic acid to the amount of carbonyl groups derived from (D) alpha-beta olefinic unsaturated carboxylic reagents on the polymer backbone is such that upon reaction with the (F) polyamine, gel-free products or products essentially gel-free, that is products not containing an excessively high viscosity are produced. That is, while some gel or viscosity increase is produced, the reaction product is substantially free from gel. A desirable ratio of (D) to (G) depends upon such factors as the number of acylating chemical functions attached to (D), the number of primary amino groups attached to (F) and the amount of (G) added to the reaction mixture, as discussed hereinbelow.

When the (D) acylating reaction product reacts with the (F) polyamine in the absence of the (G) monofunctional acid, hereinafter (D), (F) and (G), respectively, the reaction proceeds forming branches and, in many cases, a three dimensional network or structure because of the multi-functional nature of the two reactants. This results in an excessive increase in the oil thickening property of the product and, in the latter case, formation of an oil insoluble gel. When (D) reacts with (F) in the presence of (G), undesirable gel formation is avoided which creates a desirable additional dispersant in the product. The gel formation can be theoretically predicted by mathematical formulas as set forth in Prof. George Odian's textbook, *Principles of Polymerization*, 2nd Edition, pp. 96–107, McGraw Hill Book Co., New York, N.Y. which is hereby fully incorporated by reference.

An example of a theoretical aspect of a gelatin reaction will be discussed. Assume that the number average molecular weights of (D) and (G) substrate polymers are 200,000 and 1,000, respectively; the acylating chemical function is the succinic group for both (D) and (G); (F) is a polyamine containing two primary amino groups such as diethylenetriamine (DETA), triethylenetetramine or tetraethylenepentamine; the ratio of the succinic acid group to primary amine is one to one or two carbonyls to one primary amino group; and the number of the succinic anhydride group attached to (D) is variable. The critical extent of reaction (Pc) at the gel point is calculated by $$P_c = \frac{2}{f_{avg}}$$

where $f_{avg}$ is the number average functionality of a reaction mixture of (D), (G) and (F). The $f_{avg}$ can be calculated by $$f_{avg} = \frac{n_d f_d + n_g f_g + n_f f_f}{n_d + n_g + n_f}$$

where the $n_d$, $n_g$, and $n_f$ are the numbers of molecules of (D), (G) and (F), respectively; $f_d$ is the number average functionality of (D) which is variable; $f_g$ is unity, the functionality of (F) a mono-functional acid; and $f_f$ is two, the functionality of (F) a polyamine containing two primary amino groups. The Table below is the result of % Pc calculation against two variables, the weight ratio of (D) to (G), and the number average functionality, $f_d$, of (D) acylating product.

| weight Ratio of (D) to (G) | $f_d = 1$ | $f_d = 2$ | $f_d = 2.1$ | $f_d = 5$ | $f_d = 10$ | $f_d = 20$ | $f_d = 30^b$ |
|---|---|---|---|---|---|---|---|
| 0/0 | No Gel | No Gel | 98 | 70 | 65 | 55 | 53 |
| 9/1 | No Gel | No Gel | No Gel | 93 | 75 | 64 | 60 |
| 8/2 | No Gel | No Gel | No Gel | No Gel | 86 | 71 | 65 |
| 5/5 | No Gel | No Gel | No Gel | No Gel | No Gel | 88 | 79 |
| 0/10 | No Gel | No Gel | No Gel | No Gel | No Gel | No Gel | 95 |
| 0/20 | No Gel | No Gel | No Gel | No Gel | No Gel | No Gel | No Gel |
| 0/30 | No Gel | No Gel | No Gel | No Gel | No Gel | No Gel | No Gel |

CALCULATION[a] OF CRITICAL EXTENT (% Pc) OF REACTION AT THE GEL POINT

[a]Assumption: Number average molecular weight of (D) and (G) are 200,000 and 1,000, respectively. The acid function is the succinic anhydride group for both (D) and (G), and (F) is DETA. The ratio of the succinic anhydride group to primary amine is one to one, i.e., two carbonyls to one primary amino groups.
[b]$f_d$ = number average functionality of (D)

It is apparent from the Table that
(i) no gelatin takes place when the functionality of (D), $f_d$, is two or less regardless of whether or not (G) is present.
(ii) gelation occurs when $f_d$ is greater than two, and the greater the $f_d$ value is, the quicker gelation occurs.
(iii) the addition of (G) either delays the gelation or eliminates it depending upon the relative amount of (G) added to (D).

From this example, it is obvious to understand the function of (G) in this invention such as:
1. Elimination of undesirable oil-insoluble gel formation;
2. Increase in oil thickening characteristics of the product to any defined extend;

3. Allows an increased amount of (F) in the reaction. This results in an improved dispersancy in the product; and 4. Allows the use of a wide variety of more cost/performance effective amines.

Thus, various factors influence the avoidance of excessive viscosity or gel but such can be readily determined with regard to any given system, as noted above.

An alternative reaction route of the present invention, although not desired, is to initially react the (F) polyamine with the (G) mono-functional carboxylic acid. The reaction conditions are generally the same as set forth above except that the reaction temperature can be much lower, for example ambient. That is, the reaction temperature can be from about ambient, that is from about 20° C. to about 250° C. and optionally can be carried out in the presence of an inert atmosphere. Generally, at lower temperatures water need not be removed but at higher temperatures it is generally removed as by stripping with a vacuum. The reaction is generally carried out in the presence of a solvent such as mineral oil, neutral oil or the like. When the prereacted amine-acid component has been formed, the amount thereof can readily be calculated based upon the above-noted overall ratio of the number of carbonyl groups for each primary amine group, or for each primary and secondary amine group.

The reaction of the (F) polyamines and the (G) mono-functional acids with the acylating reaction product (D) can take place in a solvent medium or in a solvent-free environment, as noted above. Typical solvents are known to the art and to the literature and include various oils which are lubricant base stock such as natural and/or synthetic lubricating oils such as the following: natural oils, for example mineral lubricating oils such as liquid petroleum oils and solvent-treated or acid-treated mineral lubricating oils of paraffinic, naphthenic or mixed paraffinic-naphthenic types. Alternatively, animal and vegetable oils can also be used. Synthetic lubricating oils include alkylated aromatics, poly-alpha-olefins, alkyl phosphates, and esters derived from polybasic acids, polyols and fatty acids. Specific examples of such solvents include refined 100 to about 200 neutral mineral, paraffinic and/or naphthenic oils, diphenyldodecanes, didodecylbenzenes, hydrogenated dodecene, oligomers, and mixtures of the above. The amount of oil is generally adjusted such that viscosity of the reaction mixture is suitable for mixing. Typically the amount of oil is from about 50 to about 99% by weight and more desirably from about 70% to about 95% by weight based upon the weight of the total reaction mixture.

When the reaction is carried out in a solvent-free process, the various reactants can be added to any suitable vessel, device or apparatus in the absence of a solvent, Desirably, the various steps in the reaction sequence occur in a blending device such as an extruder, a Banbury, a 2-roll mill, or the like. Inasmuch as the reaction mixture is often very viscous, high torque blending devices are desired. The temperature of the solvent free process is similar to that set forth above with regard to the solvent process except that a higher preferred temperature, that is from about 140° C. to about 200° C. is desired. Preferred types of high torque blending devices include a twin screw extruder, and the like.

Regardless of whether the reaction is carried out in a solvent medium or in a solvent-free environment, care should be taken to remove any unreacted (B) alpha-beta carboxylic acid as by stripping. Otherwise, the unreacted acid will react with the polyamine.

In the above ratios, with regard to the various amounts of carbonyl compounds based upon the number of available primary amine groups from the (F) polyamines, it is to be noted that various amounts of (E) primary amine compounds can also be utilized. The amount of such (E) primary amine compounds is such that the above indicated ratios are satisfied. That is, the amount of (E) primary amine compounds can virtually be substituted for up to about 99% by weight of the total amount of (F) polyamine compounds.

The final or oil soluble composition which is the reaction product of the (D) acylating reaction product, the (F) polyamine and the (G) mono-functional acid can be utilized in various types of lubricating oils derived not only from petroleum but also includes synthetic lubricating oils and the like, as set forth herein below. The amount of said reaction product (D)+(F)+(G) in such lubricating oils is generally from about 0.1% to about 30% by weight and preferably from about 0.5% to about 6% by weight based upon a total weight of said lubricating oil composition which can contain various additives therein. Moreover, the said reaction product (D)+(F)+(G) of the present invention may be utilized in a concentrate form, as from about 1% to about 40% by weight based upon the total weight of the concentrate including lubricating oil and various additives therein. The lubricating oil compositions or concentrates can contain additives such as antiwear agents, antioxidants, viscosity-index improvers, dispersants, pour point depressants, dyes, and the like.

The invention will be better understood by reference to the following examples.

EXAMPLE XI

A 3505 g sample of the 24.9% polymer solution prepared in Example IV is charged to a 12-l flask equipped with a mechanical stirrer, thermometer, $N_2$ inlet, additional funnel, Dean-Stark trap, condenser, and heating mantle. Wibarco Heavy Alkylate (Wibarco Gmbh; 3561.7 g) is charged along with 195.0 g polyisobutynyl succinic anhydride (TAN=98), and the mixture is stirred and heated to 150° C. under a $N_2$ blanket to obtain a homogeneous solution (approximately 2 hrs.). When this solution has been obtained, 23.6 g DETA (diethylenetriamine) is added dropwise to the mixture from the addition funnel for over 1 hr. When all the amine has been charged, the reaction mixture is heated to 170° C. and held 4.0 hrs. while subsurface $N_2$ purging (1.0 SCFH) to remove byproduct water. This 12% polymer solution is the final product. Analytical assay of the final product gives an ANA nitrogen content of 0.13% Infrared analysis of the product confirms imide formation with no residual anhydride absorption. The kinematic viscosity at 100° C. of this dispersant-viscosity modifier is 460.0 cSt.

An API SF/CC, SAE 10W30 oil was prepared by blending 9.0% of the final product from Example XI, 8.13 %W of performance additive d$^{(d)}$, 0.2 %W Acr 156, in a lubricating base stock. This oil thereby contains 1.08 %W of the product copolymer. When evaluated in the Ford Sequence VD engine test, a merit rating of 9.51 sludge, 6.64 varnish and 6.88 piston skirt varnish is achieved after 192 test hours.

(d) Performance Additive D: %SA=12.9; %Zn=1.56; P=1.41; %Ca=1.23; %M=1.16; %N=0.52; %S=4.27; TBN=85.8.

EXAMPLE XII 700 g of the 14.9 %W polymer solution prepared in Example VI is charged to a flask equipped in a manner as set forth in Example XI. 321.2 g Wibarco Heavy Alkylate (Wibarco Gmbh) is added along with 24.8 g polyisobutenyl succinic anhydride (TAN=98) and heated to 150° C. under a $N_2$ blanket. Once a homogenous solution is obtained, 3.0 g of DETA is added dropwise over 1 hr. After all the amine is charged, the reaction mixture is heated to 175° C. and held 4.0 hrs. with subsurface $N_2$ purge (110 SCFH) to remove byproduct water. This 10 %W polymer solution gives the final product. Analytical assay of the final product gives an ANA nitrogen content of 0.12% (0.12% theoretical). Infrared analysis of the product confirms imide formation with no risidual anhydride absorptions. the appearance of the concentrate is clear.

The following description with regard to natural and synthetic lubricating oils in which the VI improver/dispersant of the present invention is applicable with regard to the (D) acylating reaction product formation, the subsequent reaction of the (D) acylating reaction product with the (E) primary amine containing compound, or said reaction of said (D) acylating reaction product with said (F) polyamine and said (G) monofunctional acid. Accordingly, the following list not only serves as lubricating oils to which the compositions of the present invention can be added but also compositions which can serve as a suitable solvent. Suitable lubricating oils include natural oils, animal oils, and vegetable oils as well as mineral lubricating oils such as liquid petroleum oils, solvent-treated or acid-treated mineral lubricating oils of paraffinic, naphthenic or mixed paraffinic-naphthenic types. Oils of lubricating viscosity derived from coal or shale are also useful. Synthetic lubricating oils include hydrocarbon oils and halo-substituted hydrocarbon oils such as polymerized and interpolymerized olefins (e.g., oligobutylenes, oligopropylenes, and propylene-ethylene oligomers, chlorinated polybutylenes, etc.); oligo(1-hexenes), oligo(1-octenes), oligo(1-decenes), etc. and mixtures thereof; alkyl-benzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, or the $C_{13}$ oxo acid diester of tetraethylene glycol.

Another suitable class of synthetic lubricating oils that can be used comprises the esters of dicarboxylic acids (e.g., phthalic acid, succinic acid, alkylsuccinic acids, alkenylsuccinic acids, maleic acid, azelaic acid, suberic acid, sebacic acid, fumaric acid, adipic acid, linoleic acid dimer, malonic acid, alkylmalonic acids, alkenylmalonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include butyl adipate, (2-ethylhexyl sebacate, n-hexyl fumarate, octyl sebacate, isooctyl azelate, isodecyl azelate, octyl phthalate, decyl phthalate, eicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-hexyl)silicate, tetra-(p-tert-butylphenyl)silicate, hexa-(4-methyl-2-pentoxy)-disiloxane, poly(methyl)siloxanes, poly(methylphenyl)siloxanes, etc.).

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Re-refined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

The invention also contemplates the use of other additives in combination with the viscosity improver compositions of this invention. Such additives include, for example, detergents and dispersants of the ash-producing or ashless type, corrosion- and oxidation-inhibiting agents, pour point depressing agents, extreme pressure agents, antiwear agents, color stabilizers and antifoam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthols, alkylphenols, thiophenol, sulfurized alkylphenols, and condensation products of formaldehyde with phenolic substance; alcohols such as methanol, 1-propanol, octyl alcohol, cellosolve, carbitol, ethylene glycol, stearyl alcohol, and cyclohexyl alcohol; and amines such as aniline, phenylenediamine, phenothiazine, N-phenyl-betanaphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Pat. No. 1,306,529 and in many U.S. patents including the following:

U.S. Pat. Nos. 3,163,603, 3,184,474, 3,215,707, 3,219,666, 3,271,310, 3,272,746, 3,281,357, 3,306,908, 3,311,558, 3,316,177, 3,340,281, 3,341,542, 3,346,493, 3,351,552, 3,391,022, 3,399,141, 3,415,750, 3,433,744, 3,444,170, 3,448,048, 3,448,049, 3,451,933, 3,454,607, 3,467,668, 3,501,405, 3,522,179, 3,541,012, 3,542,678, 3,542,680, 3,567,637, 3,574,101, 3,576,743, 3,630,904, 3,632,510, 3,632,511, 3,697,428, 3,725,441, 4,234,435, Re 36,433.

(2) Reaction products of relatively high molecular weight aliphatic or alicyclic halides with amines, preferably oxyalkylene polyamines. These may be characterized as "amine dispersants" and examples thereof are described for example, in the following U.S. patents:

U.S. Pat. Nos. 3,275,554, 3,438,757, 3,454,555, 3,565,804.

(3) Reaction products of alkylphenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative:

U.S. Pat. Nos. 2,459,112, 2,962,442, 2,984,550, 3,036,003, 3,166,516, 3,236,770, 3,355,370, 3,368,972, 3,413,347, 3,442,808, 3,448,047, 3,454,497, 3,459,661, 3,461,172, 3,493,520, 3,539,633, 3,558,743, 3,586,629, 3,591,598, 3,600,372, 3,634,515, 3,649,229, 3,697,574, 3,725,277, 3,725,480, 3,726,882, 3,980,569.

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

U.S. Pat. Nos. 3,036,003, 3,087,936, 3,200,107, 3,216,936, 3,254,025, 3,256,185, 3,278,550, 3,280,234, 3,281,428, 3,282,955, 3,312,619, 3,366,569, 3,367,943, 3,373,111, 3,403,102, 3,442,808, 3,445,831, 3,455,832, 3,493,520, 3,502,677, 3,513,093, 3,533,945, 3,539,633, 3,573,010, 3,579,450, 3,591,598, 3,600,372, 3,639,242, 3,649,229, 3,649,659, 3,658,836, 3,697,574, 3,702,757, 3,703,536, 3,704,308, 3,708,422.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. patents:

U.S. Pat. Nos. 3,329,658, 3,449,250, 3,519,565, 3,666,730, 3,687,849, 3,702,300.

The above-noted patents are incorporated by reference herein for their disclosures of ashless dispersants.

Extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, chlorobenzyl disulfide, butyl tetrasulfide, sulfurized methyl ester of oleic acid, sulfurized alkylphenols, sulfurized dipentene, and sulfurized terpenes; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phospite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyldithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Many of the above-mentioned auxiliary extreme pressure agents and corrosion-oxidation inhibitors also serve as antiwear agents. Zinc dialkylphosphorodithioates are well known example.

Pour point depressants are a particularly useful type of additive often included in the lubricating oils described herein. The use of such pour point depressants in oil-based compositions to improve low temperature properties of oil-based compositions are well known in the art. See, for example, page 8 of "Lubricant Additives" by C. V. Smalheer and R. Kennedy Smith (Lezius-Hiles Co. publishers, Cleveland, Ohio, 1967).

Examples of useful pour point depressants are polymethacrylates; polyacrylates; polyacrylamides; condensation products of haloparaffin waxes and aromatic compounds; vinyl carboxylate polymers; and terpolymers of dialkyl fumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in "Foam Control Agents", by Henry T. Kerner (Noyes Data Corporation. 1976), pages 125-162.

While in accordance with the Patent Statutes, a best mode and a preferred embodiment have been set forth, it is to be understood that various modifications thereof will become apparent to those skilled in the art upon reading of the specification. Therefore, it is to be understood that the invention disclosed herein is intended to cover such modifications as fall within the scope of the attached claims.

What is claimed is:

1. An oil soluble composition, comprising; the reaction product of: an (D) acylating reaction product, a (F) polyamine, and a (G) mono-functional acid.

2. An oil soluble composition according to claim 1, wherein said (D) acylated reaction product is the reaction product of:
   (A) a hydrogenated block copolymer comprising a normal block copolymer or a random block copolymer, said normal block copolymer made from a vinyl substituted aromatic and an aliphatic conjugated diene, said normal block copolymer having from two to about five polymer blocks with at least one polymer block of said vinyl substituted aromatic and at least one polymer block of said hydrogenated aliphatic conjugated diene, said random block copolymer made from vinyl substituted aromatic and aliphatic conjugated diene monomers, the total amount of said vinyl substituted aromatic blocks in said block copolymer being in the range of from about 20 percent to about 70 percent by weight and the total amount of said diene blocks in said block copolymer being in the range of from about 30 percent to about 80 percent by weight; the number average molecular weight of said block copolymer and said random block copolymer being in the range of about 10,000 to to about 500,000;
   (B) an alpha-beta olefinically unsaturated carboxylic reagent including functional derivatives thereof containing 2 to about 20 carbon atoms exclusive of the carboxyl-based groups in an amount of from about 0.25 percent to about 20 percent by weight based upon the total weight of said (A) block copolymer and said (B) unsaturated carboxylic reagent; and;
   (C) from about 0.01 to about 5 percent by weight of a free radical initiator based upon the weight of said (A) block copolymer and said (B) unsaturated carboxylic reagent.

3. An oil soluble composition according to claim 2, wherein said (F) polyamine is an amine compound having at least two amino groups with each said amino group having at least one active hydrogen thereon, and wherein said (G) mono-functional carboxylic acid is a carboxylic acid acylating agent or a hydrocarbon-based monocarboxylic acid having from 1 to about 50 carbon atoms.

4. An oil soluble composition according to claim 3, wherein said (F) polyamine is an alkylene polyamine, a polyamine bottom, a branched polyalkylene polyamine, or a polyoxyalkylene polyamine, and wherein said (G) carboxylic acid acylating agent has a hydrocarbon based substituent thereon wherein said hydrocarbon based substituent has from about 3 to about 1,000 carbon atoms.

5. An oil soluble composition according to claim 4, wherein the amount of said (G) mono-functional carboxylic acid is an effective amount to substantially produce a substantially gel-free product.

6. An oil soluble composition according to claim 5, wherein said (A) normal block copolymer has a total of two or three polymer blocks, wherein the number average molecular weight of said block and said random copolymer is from about 30,000 to about 200,000, wherein in said block copolymer the total amount of said conjugated diene is from about 40% to about 60% by weight and the total amount of said vinyl substituted aromatic is from about 40% to about 60% by weight, wherein said (B) unsaturated carboxylic reagent is selected from the group consisting of maleic anhydride, citraconic anhydride, itaconic anhydride, glutaconic anhydride, chloromaleic anhydride, methyl maleic anhydride, acrylic acid, methacrylic acid, fumaric acid, maleic acid, maleimide, maleamic acid, lower alkyl esters of such acids, and combinations thereof, and wherein the amount of said (B) unsaturated carboxylic reagent is from about 0.5 to about 5.0% by weight.

7. An oil soluble composition according to claim 6, wherein said (G) monofunctional acid is said carboxylic acid acylating agent, said carboxylic acid acylating agent having the formula:

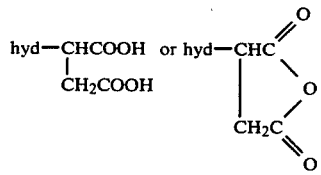

wherein said hyd is said hydrocarbon based substituent.

8. An oil soluble composition according to claim 7, wherein said conjugated diene is isoprene or butadiene, wherein said vinyl substituted aromatic is styrene, and wherein said (A) hydrogenated normal block copolymer and random block copolymer contain no more than 0.5% residual olefinic unsaturation.

9. An oil soluble composition according to claim 8 wherein said reaction product has a total acid number of from about 0.1 to about 60, wherein said polyamine is said alkylene polyamine, said alkylene polyamine having the formula:

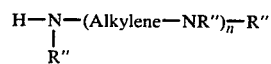

wherein n is from 1 to about 10, wherein each R", independently is hydrogen of a hydrocarbyl group having from 1 to 30 carbon atoms, and wherein said alkylene group has from 1 to about 10 carbon atoms.

10. An oil soluble composition according to claim 9, wherein said free (C) radical initiator is an organic peroxide or an an organic azo initiator.

11. An oil soluble composition according to claim 10, wherein said reaction product has a total acid number of from about 0.5 to about 20 and wherein said (B) unsaturated carboxylic reagent is selected from the group consisting of fumaric acid, maleic acid, and maleic anhydride.

12. An oil soluble composition according to claim 11, wherein n of said alkylene polyamine is from 2 to 7, wherein each R" is hydrogen, wherein said hydrocarbon substituent of said hydrocarbon based mono-functional acid contains from 12 to about 500 carbon atoms.

13. An oil soluble composition according to claim 1, wherein the (D) acylating reaction formation temperature is from about 100° C. to about 300° C., and wherein the reaction temperature of said (D) acylating reaction product with said (F) polyamine and said (G) mono-functional acid is from about 50° C. to about 250° C.

14. An oil soluble composition according to claim 10, wherein the (D) acylating reaction formation temperature is from about 100° C. to about 300° C., and wherein the reaction temperature of said (D) acylating reaction product with said (F) polyamine and said (G) mono-functional acid is from about 50° C. to about 250° C.

15. An oil soluble composition according to claim 1, wherein said (D) acylating reaction product is made in the presence of a solvent.

16. An oil soluble composition according to claim 7, wherein said (D) acylating reaction product is made in the presence of a solvent.

17. An oil soluble composition according to claim 12, wherein said (D) acylating reaction product is made in the presence of a solvent.

18. An oil soluble composition according to claim 15, wherein the reaction product of said (D) acylating reaction product with said (F) polyamine and said (G) mono-functional acid is made in the presence of a solvent.

19. An oil soluble composition according to claim 16, wherein the reaction product of said (D) acylating reaction product with said (F) polyamine and said (G) mono-functional acid is made in the presence of a solvent.

20. An oil soluble composition according to claim 15, wherein the reaction product of said (D) acylating reaction product with said (F) polyamine and said (G) mono-functional acid occurs in a solvent-free environment.

21. An oil soluble composition according to claim 16, wherein the reaction product of said (D) acylating reaction product with said (F) polyamine and said (G) mono-functional acid occurs in a solvent-free environment.

22. An oil soluble composition according to claim 1, wherein said (D) acylating reaction product is made in the presence of a solvent-free environment.

23. An oil soluble composition according to claim 7, wherein said (D) acylating reaction product is made in the presence of a solvent-free environment.

24. An oil soluble composition according to claim 22, wherein the reaction product of said (D) acylating reaction product with said (F) polyamine and said (G) mono-functional acid is made in the presence of a solvent.

25. An oil soluble composition according to claim 23, wherein the reaction product of said (D) acylating reaction product with said (F) polyamine and said (G) mono-functional acid is made in the presence of a solvent.

26. An oil soluble composition according to claim 22, wherein the reaction product of said (D) acylating reaction product with said (F) polyamine and said (G) mono-functional acid occurs in a solvent-free environment.

27. An oil soluble composition according to claim 23, wherein the reaction product of said (D) acylating reaction product with said (F) polyamine and said (G) mono-functional acid occurs in a solvent-free environment.

28. A lubricant composition comprising a major amount of a mineral oil and a minor amount of a composition of claim 1.

29. A lubricant composition comprising a major amount of a mineral oil and a minor amount of a composition of claim 7.

30. A lubricant composition comprising a major amount of a mineral oil and a minor amount of a composition of claim 12.

31. An additive concentrate including a diluent oil and from about 1% to about 40% by weight of the composition of claim 1.

32. An additive concentrate including a diluent oil and from about 1% to about 40% by weight of the composition of claim 7.

33. An additive concentrate including a diluent oil and from about 1% to about 40% by weight of the composition of claim 12.

34. A process for making a oil soluble composition, comprising; reacting an (D) acylating reaction product with a (F) polyamine and an effective amount of a (G) mono-functional acid to produce the oil soluble composition.

35. A process according to claim 34, wherein said (F) polyamine is an amine compound having at least two amino groups with each said amino group having at least one active hydrogen thereof, and therein said (G) mono-functional acid is a monocarboxylic acid acylating agent or hydrocarbon-based monocarboxylic acid having from 1 to about 50 carbon atoms.

36. A process according to claim 35, wherein said polyamine is an alkylene polyamine, a polyamine bottom, a branched polyalkylene polyamine, or a polyoxyalkylene polyamine, and wherein said carboxylic acid acylating agent has a hydrocarbon based substituent thereon wherein said hydrocarbon based substituent has from about 3 to about 1,000 carbon atoms.

37. A process according to claim 36, wherein said hydrocarbon based monocarboxylic acid has the formula:

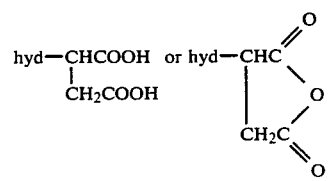

wherein said hyd is said hydrocarbon based substituent.

38. A process according to claim 37, wherein said (D) acylating reaction product is obtained from a conjugated diene which is isoprene or butadiene, and styrene, to form a block copolymer wherein said block copolymer is a (A) hydrogenated normal block copolymer and random block copolymer which contains no more than 0.5% residual olefinic unsaturation and wherein said reaction product has a total acid number of from about 0.1 to about 60, wherein said polyamine is said alkylene polyamine, said alkylene polyamine having the formula:

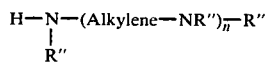

wherein n is from 1 to about 10, wherein each R'', independently, is hydrogen or a hydrocarbyl group having from 1 to 30 carbon atoms, and wherein said alkylene group has from 1 to about 10 carbon atoms.

39. A process according to claim 38, wherein said reaction product has a total acid number of from about 0.5 to about 20 and wherein said (B) unsaturated carboxylic reagent is selected from the group consisting of fumaric acid, maleic acid, and maleic anhydride, and wherein said (D) acylating reaction product is a reaction product of:
 (A) a hydrogenated block copolymer comprising a normal block copolymer or a random block copolymer, said normal block copolymer made from a vinyl substituted aromatic and an aliphatic conjugated diene, said normal block copolymer having from 2 to about 5 polymer blocks with at least one polymer block of said vinyl substituted aromatic and at least one polymer block of said hydrogenated aliphatic conjugated diene, said random block copolymer made from vinyl substituted aromatic and aliphatic conjugated diene monomers, the total amount of said vinyl substituted aromatic blocks in said block copolymer being in the range of from about 20% to about 70% by weight and the total amount of said diene blocks in said block copolymer being in the range of from about 30% to about 80% by weight; the number average molecular weight of said block copolymer and said random block copolymer being in the range of about 10,000 to about 500,000;
 (B) an alpha-beta olefinically unsaturated carboxylic reagent including functional derivatives thereof containing 2 to about 20 carbon atoms exclusive of the carboxyl-based groups in an amount of from about 0.25% to about 20% by weight based upon the total weight of said (A) block copolymer and said (B) unsaturated carboxylic reagent; and;
 (C) from about 0.01 to about 5% by weight of a free radical initiator based upon the weight of said (A) block copolymer and said (B) unsaturated carboxylic reagent.

40. A process according to claim 34, wherein said reaction is carried out in a solvent.

41. A process according to claim 38, wherein said reaction is carried out in a solvent.

42. A process according to claim 37, wherein said reaction is carried out in a solvent-free environment.

43. A process according to claim 40, wherein said reaction is carried out at a temperature of from about 50° C. to about 250° C.

44. A process according to claim 41, wherein said reaction is carried out at a temperture of from about 50° C to about 250° C.

45. A process according to claim 42, wherein said reaction is carried out at a temperature of from about 50° C. to about 250° C.

* * * * *